United States Patent
Cai (10) Patent No.: US 10,311,120 B2
(45) Date of Patent: Jun. 4, 2019

(54) METHOD AND APPARATUS FOR IDENTIFYING WEBPAGE TYPE

(71) Applicant: TENCENT TECHNOLOGY (SHENZHEN) COMPANY LIMITED, Shenzhen (CN)

(72) Inventor: Bing Cai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 487 days.

(21) Appl. No.: 14/627,311

(22) Filed: Feb. 20, 2015

(65) Prior Publication Data

US 2015/0161278 A1 Jun. 11, 2015

Related U.S. Application Data

(63) Continuation of application No. PCT/CN2013/081836, filed on Aug. 20, 2013.

(30) Foreign Application Priority Data

Aug. 22, 2012 (CN) .......................... 2012 1 0299843

(51) Int. Cl.
*G06F 16/954* (2019.01)
*G06F 16/958* (2019.01)
*G06Q 30/02* (2012.01)

(52) U.S. Cl.
CPC .......... *G06F 16/954* (2019.01); *G06F 16/958* (2019.01); *G06Q 30/0204* (2013.01)

(58) Field of Classification Search
CPC ........................... H04L 67/02; G06F 17/30598
See application file for complete search history.

(56) References Cited

U.S. PATENT DOCUMENTS

| | | | | |
|---|---|---|---|---|
| 6,839,680 B1 * | 1/2005 | Liu | ..................... | G06Q 30/0204 705/7.33 |
| 7,702,675 B1 * | 4/2010 | Khosla | .............. | G06F 17/30884 707/710 |
| 8,494,897 B1 * | 7/2013 | Dawson | ................. | G06Q 30/02 705/14.42 |
| 2003/0194689 A1 * | 10/2003 | Kamasaka | ............ | G06F 17/272 434/350 |

(Continued)

FOREIGN PATENT DOCUMENTS

| CN | 101178714 A | 5/2008 |
|---|---|---|
| CN | 101452463 A | 6/2009 |

(Continued)

OTHER PUBLICATIONS

International Search Report for International Application No. PCT/CN2013/081836, dated Nov. 28, 2013.

(Continued)

*Primary Examiner* — Amanda L Willis
*Assistant Examiner* — Vaishali Shah
(74) *Attorney, Agent, or Firm* — Brinks Gilson & Lione (57) ABSTRACT

Various embodiments provide a method and an apparatus for identifying webpage type. The method includes: judging whether a web address to be classified matches with a webpage classification rule in at least two webpage classification rules; and determining the type of the webpage to be a type corresponding to a webpage classification rule which matches with the web address.

16 Claims, 5 Drawing Sheets

(56) References Cited

U.S. PATENT DOCUMENTS

| | | | | |
|---|---|---|---|---|
| 2004/0128136 A1* | 7/2004 | Irani | .................... | H04M 3/4938 |
| | | | | 704/270.1 |
| 2006/0230055 A1* | 10/2006 | Marcjan | .............. | G06F 17/3089 |
| 2007/0294252 A1 | 12/2007 | Fetterly et al. | | |
| 2008/0013940 A1* | 1/2008 | Jung | .................... | G03D 15/001 |
| | | | | 396/78 |
| 2008/0104113 A1* | 5/2008 | Wong | ................ | G06F 17/30867 |

FOREIGN PATENT DOCUMENTS

| | | | |
|---|---|---|---|
| CN | 101727447 A | 6/2010 | |
| CN | 101872347 | * 10/2010 ............. | G06F 17/30 |
| CN | 101872347 A | 10/2010 | |
| CN | 102411587 A | 4/2012 | |
| EP | 2423837 A1 | 2/2012 | |
| WO | WO 2010/120941 A2 | 10/2010 | |

OTHER PUBLICATIONS

International Preliminary Report on Patentability Issued for International Application No. PCT/CN2013/081836 dated Mar. 5, 2015 in 6 pages.
Office Action Issued for Chinese Application No. 201210299843.7 dated Apr. 19, 2017 in 9 pages.

\* cited by examiner

METHOD AND APPARATUS FOR IDENTIFYING WEBPAGE TYPE

RELATED DOCUMENTS

This application is a continuation of International Application No. PCT/CN2013/081836, filed on Aug. 20, 2013. This application claims priority to Chinese Patent Application 201210299843.7, filed on Aug. 22, 2012. The entire disclosures of each of the above applications are incorporated herein by reference.

FIELD

The present disclosure relates to type identification technology, and particularly, to a method and an apparatus for identifying webpage type (i.e., type of webpage).

BACKGROUND

This section provides background information related to the present disclosure which is not necessarily prior art.

With the rapid development in Internet, it has become an important task to identify the type of a "WWW" webpage. At present, there are mainly two types of methods for identifying webpage type. One method classifies webpages manually by using professional knowledge of the person performing the classification. This method is efficient in identifying webpages within a known field, and is highly accurate and fast in speed. But the method has limited extendibility due to the restriction of manpower. A shortage of manpower will make it impossible to process huge amount of webpages from various fields. The other method is based on text classification, e.g., Simple Bias, Support Vector Machine (SVM) and so on. This method is based on statistics and samples, requires less manual intervention, and provides a certain degree of accuracy and good coverage of various fields. But the method requires large amounts of computations, is time-consuming, thus cannot meet requirements of real time webpage type identification. Therefore, the above two methods have respective deficiencies and cannot meet the requirements for real time webpage type identification.

SUMMARY

This section provides a general summary of the disclosure, and is not a comprehensive disclosure of its full scope or all of its features.

Various embodiments of the present disclosure provide a method and an apparatus for identifying webpage type to solve at least some of the problems faced by conventional techniques.

Various embodiments provide a method for identifying webpage type. The method may include: receiving a web address of a webpage to be classified, analyzing the web address to obtain components of the web address; judging whether at least one of the components matches with a webpage classification rule; obtaining a type of the webpage by classifying the webpage using the webpage classification rule in response to a determination that the at least one component matches with the webpage classification rule; obtaining the type of the webpage by sending the web address into a webpage classifier in response to a determination that the at least one components does not match with the webpage classification rule.

Various embodiments also provide an apparatus for identifying webpage type. The apparatus may include an analyzing module and a judging module. The analyzing module may receive a web address of a webpage to be classified, and analyze the web address to obtain components of the web address. The judging module may judge whether at least one of the components matches with a webpage classification rule in a webpage classification rule base, obtain a type of the webpage by classifying the webpage using the webpage classification rule in response to a determination that the at least one component matches with the webpage classification rule, and obtain a type of the webpage by sending the web address into a webpage classifier in response to a determination that the at least one component does not match with the webpage classification rule.

Various embodiments also provide a method for identifying webpage type. The method may include:
 judging whether a web address to be classified matches with a webpage classification rule in at least two webpage classification rules; and
 determining the type of the webpage to be a type corresponding to a webpage classification rule which matches with the web address.

Various embodiments also provide a method for presenting a webpage. The method may include:
 judging whether a web address to be classified matches with a webpage classification rule in at least two webpage classification rules;
 determining the type of the webpage is determined to be a type corresponding to a webpage classification rule which matches with the web address;
 extracting content of the webpage based on the type of the webpage determined; and
 presenting the content of the webpage extracted to a user in a pre-defined manner.

Various embodiments also provide an apparatus for identifying webpage type. The apparatus may include:
 a judging module, configured to judge whether a web address to be classified matches with a webpage classification rule in at least two webpage classification rules; and
 a type determining module, configured to determine the type of the webpage to be a type corresponding to a webpage classification rule which matches with the web address found by the judging module.

Various embodiments also provide an apparatus for presenting a webpage. The apparatus may include:
 a judging module, configured to judge whether a web address to be classified matches with a webpage classification rule in at least two webpage classification rules;
 a type determining module, configured to determine the type of the webpage is determined to be a type corresponding to a webpage classification rule which matches with the web address found by the judging module;
 a content extracting module, configured to extract content of the webpage based on the type of the webpage determined by the type determining module; and
 a webpage presenting module, configured to present the content of the webpage extracted by the content extracting module to a user in a pre-defined manner.

It can be seen that various embodiments judge whether at least one component of a web address matches with a webpage classification rule, obtain the type of the webpage by classifying the webpage using the webpage classification rule when the at least one component matches with the webpage classification rule or by sending the web address into a webpage classifier when the at least one component does not match with the webpage classification rule. Therefore, the type of a webpage can be estimated based only on the web address of the webpage. The process is fast in speed, efficient, and capable of identifying various knowledge fields, thus is applicable to online real-time webpage type estimation systems.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Features of the present disclosure are illustrated by way of example and not limited in the following figure(s), in which like numerals indicate like elements, in which.

Corresponding reference numerals indicate corresponding parts throughout the several views of the drawings.

EMBODIMENTS OF THE INVENTION

For simplicity and illustrative purposes, the present disclosure is described by referring mainly to an example thereof. In the following description, numerous specific details are set forth in order to provide a thorough understanding of the present disclosure.

It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
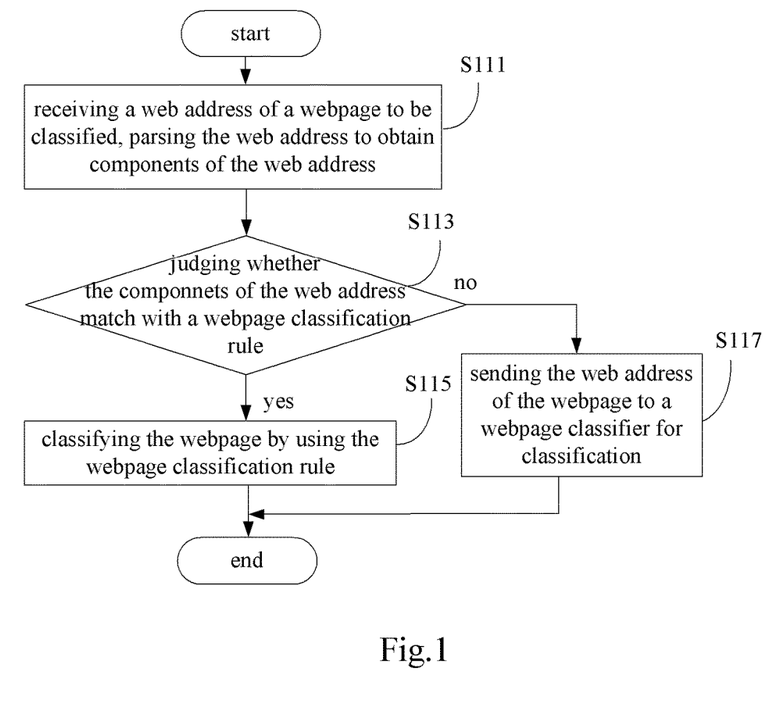
FIG. 1 is a flowchart illustrating a method for identifying webpage type according to an embodiment of the present disclosure.

FIG. 1 is a flowchart illustrating a method for identifying webpage type according to an embodiment of the present disclosure. As shown in FIG. 1, the method for identifying webpage type may include the following procedures.

In block S111, a web address (e.g., a Uniform/Universal Resource Locator (URL)) of a webpage which is to be classified is received and analyzed to obtain components of the web address.

In this procedure, the web address may be in the form of http://domain name X/directory A/directory B/.../abc.html, and the components obtained may include the protocol type "http", the domain name "X", directory names "A" and "B", and a parameter "abc.html".

In an embodiment, some components of the web address may be parsed into a character string, e.g., the directory names A and B may be parsed into 20110202, and the like.

The method of parsing the components may include dividing the web address into segments, e.g., taking a string between two adjacent symbol "l" as a segment, and taking the segments as the components. Other processing may be applied to the segments obtained, and the processing results may be taken as the components. This is not limited in the present disclosure.

In block S113, it is judged whether at least one of the components of the web address matches with a webpage classification rule, and the procedure in block S115 may be performed in response to a determination that the at least one component matches with the webpage classification rule, or the procedure in block S117 may be performed in response to a determination that the at least one component does not match with the webpage classification rule.

In an embodiment, the webpage classification rule may be a multi-pattern string including a relation which associates a group of web addresses with a webpage type. Suppose in a webpage classification rule, a character string obtained by parsing a directory name in web addresses in a group is 2010* (* represents any information, e.g., characters, digits, and the like), and the type of the group is "news". When a web address to be classified has a directory name which is parsed to be 20100202, it is determined that the web address matches with the webpage classification rule. When a web address to be classified has a directory name which is parsed to be 20120202, it is determined that the web address does not match with the webpage classification rule.

In an embodiment, the webpage classification rule may include a relation which associates information of characteristics of web address with a webpage type. The characteristics may be characters (including letters, characters, words, symbols, digits and the like) included in at least one component of a web address, e.g., the word "news" in a domain name or a directory name of a web address, or a string included in at least one component, e.g., the digit string "2010" in at least one component (including at least one of a domain name, a directory name, a parameter and the like) which is parsed into a multi-pattern string, and so on.

The webpage classification rules (also simply referred to as rules) may be defined manually, or obtained through a certain algorithm based on a policy, and this is not limited in the present disclosure.

The rules may be stored in a database, or a collection of the rules are referred to as a rule base. When a web address is to be classified, the collection of rules is searched to find a rule which matches with the web address. If there is a rule matching with the web address, the web address is classified by using the rule, i.e., the type defined in the rule is determined to be the type of the web address. If no rule in the collection of rules matches with the web address, the web address is classified by using another method.

In block S115, a webpage type of the webpage to be classified is obtained by using the webpage classification rule.

In an embodiment, when at least one component of the web address matches with the webpage classification rule, the webpage is classified by using the webpage classification rule to obtain the type of the webpage, i.e., the type of the webpage is determined to be the webpage type in the webpage classification rule. Taking a webpage classification rule as an example, according to the rule, a character string obtained by parsing a directory name in web addresses in a group is 2010* (* represents any data, e.g., characters, digits, and the like), and the type of the group is news. If a web address of a webpage to be classified has a directory name which is parsed to be 20100303, it is determined the type of the webpage to be classified belongs to the type of "news".

In block S117, the web address to be classified is sent to a webpage classifier to obtain the type of the webpage.

In an embodiment, it is judged whether at least one component of a webpage to be classified matches with a webpage classification rule, the webpage is classified to obtain the type of the webpage by using the webpage classification rule in response to a determination that the at least one component of the webpage matches with the webpage classification rule, or the webpage is sent into a webpage classifier to obtain the type of the webpage in response to a determination that the at least one component does not match with any webpage classification rule. Therefore, the type of the webpage is determined merely based on a web address, and the detection process is fast and in real time.

Figure 2:
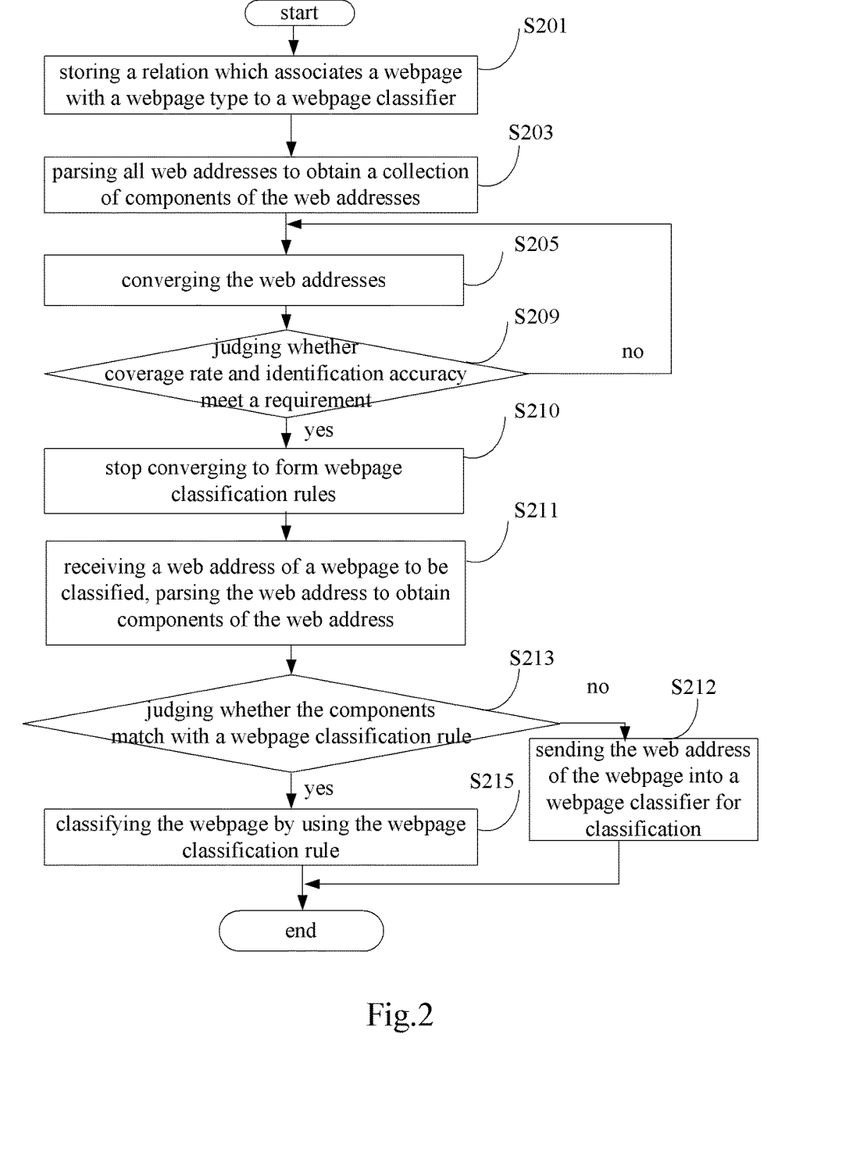
FIG. 2 is a flowchart illustrating a method for identifying webpage type according to an embodiment of the present disclosure.

FIG. 2 is a flowchart illustrating a method for identifying webpage type according to an embodiment of the present disclosure. FIG. 2 is evolved from FIG. 1. As shown in FIG. 2, the method for identifying webpage type may include the following procedures.

In block S201, a relation which associates web addresses with a webpage type is generated by using webpage samples, and is stored in a webpage classifier.

In this procedure, when the relation is generated, content of the webpage samples may be analyzed, and the relation which associates the web addresses with the webpage type is obtained through training by using the samples according to methods such as the artificial neural network method and the like. In other embodiments, the procedure in block S201 may be omitted according to the needs.

In an embodiment, webpage samples which are pre-classified into groups are provided, and each group is corresponding to a type of webpage. The groups of webpage samples may be used for generating the webpage classification rules e.g., as in block S210, by using analyzing and converging methods. In an example, the groups of webpage samples may also be used for training a webpage classifier. The two or more types of the samples are the types that the webpage classifier is able to identify in subsequent webpage classification.

In block S203, all pre-stored web addresses and webpage types are read out, all of the web addresses are parsed to obtain a collection of components of the web addresses.

In an embodiment, all of the web addresses and corresponding webpage types may be stored in a webpage classifier or another storage device in advance. For example, when a web address is in the form of http://domain name X/directory name A/directory name B/.../abc.html, the collection of components of the web address is S={domain name X, directory name A, . . . , directory name N, abc.html}, and the order of the elements in the collection is the same with the order of the components in the web address.

In block S205, web addresses having at least one similar or identical component are converged into one group according to a converging method, and multiple groups may be formed.

In an embodiment, the converging method for converging web addresses having at least one identical component into a group may be as follows: supposing a collection of components of a web address is S1={domain name X, directory name A1, . . . directory name N1, abc.html}, a collection of components of another web address is S2={domain name X, directory name A2, . . . , directory name N2, 123.html}, when the directory names A1, . . . , N1 in collection S1 is parsed into a character string of 20120101, and the directory names A2, . . . , N2 in collection S2 is parsed into a character string of 20120102, it may be determined the components of the two web addresses are partly the same, and the two web addresses are converged into the same group.

In another embodiment, the method for converging web addresses of the same webpage type that have at least one identical component into a group may include: establishing a tree that has a root node, adding each web address into the tree by using the components of the web address, converging the branches with the same node value starting from the root node to obtain a converged tree; and generating a webpage classification rule which associates the webpage type of the web addresses with a set of expressions obtained from the branches of the converged tree.

In an embodiment, the step of adding a web address into the tree may include: adding the first component of the web address as a child node of the root node, and adding a component of the web address as a child node of the component arranged before the component, i.e., the second component is added as the child node of the first component, and the third component is added as the child node of the second component, and so on.

Figure 8:
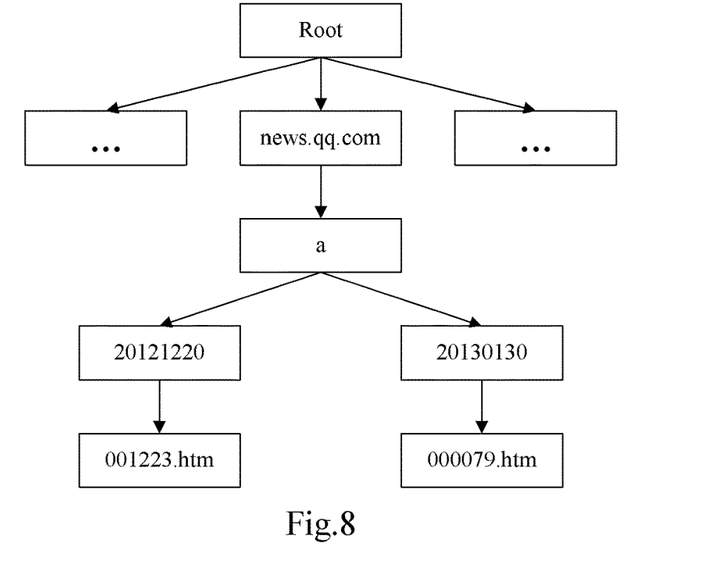
FIG. 8 is a schematic diagram illustrating convergence of web addresses according to an embodiment of the present disclosure.

In an embodiment, the step of converging the branches with the same node value starting from the root node may include: starting from the child nodes of the root node, i.e., the first layer of nodes, searching in each layer for nodes that share the same parent node and have the same value (i.e., the same component), deleting other nodes that have the same value with that of a first node, and grafting the branches of the deleted nodes on the first node, i.e., making child nodes of the deleted nodes as the child nodes of the first node; and the above processing is performed for the layers one after another until the last layer, i.e., the leaf nodes. For example, two web addresses, i.e., http://news.qq.com/a/20121220/a/001223.htm and http://news.qq.com/a/20130130/a/000079.htm, may be converged into a branch as shown in FIG. 8. Since the first two components of the two web addresses are identical, the first two layers of the two branches representing the two web addresses are converged into one branch, and the components "20121220" and "20130130" share the same parent node of "a".

In an embodiment, before the step of converging the branches, the values of the nodes (i.e., the components of the web addresses serving as the nodes) may be processed by using a pre-defined processing method. For example, digits in a component may be represented by an expression, e.g., 20121220 may be represented as [0-9]{8} in which [0-9] indicates the characters are digits and {8} indicates there are 8 digits. Other types of characters, e.g., letters, symbols and the like, may be processed in similar manners or other application methods.

In various embodiments, various manners may be adopted for generating the expressions from the branches of the converged tree. For example, components in a pre-defined number of layers in each branch may form an expression, e.g., in the example as shown in FIG. 8, an expression obtained may be "news.qq.com/" or "news.qq.com/a/". For another example, components in a branch whose parent node has only one child node may form an expression, e.g., in the example as shown in FIG. 8, an expression obtained may be "news.qq.com/a/". For yet another example, components whose parent node has more than one child nodes may be processed to make the components having a uniform expression, e.g., the string "20121220" may be expressed as [0-9]{8} as in the above example, in this way, the string "20130130" may be expressed as [0-9]{8}, thus the two nodes may be converged. In this way, an expression generated from the branch as shown in FIG. 8 may be "news.qq.com/a/[0-9]{8}40-91{6}". For yet another example, components whose parent node has more than one child nodes may be simply expressed by a string, such as "+", "[^/]+", or the like.

As an example, a webpage classification rule may be illustrated as:

```
{
Webpage Type: News;
Expressions:
http://news.qq.com/a/[0-9]{8}/[0-9]{6}.htm
http://news.163.com/[0-9]{2}/[0-9]{4}/[0-9]{2}/[^/]+
http://sports.qq.com/a/[0-9]{8}/[0-9]{6}.htm
http://ent.people.com.cn/gb/[0-9]{8}.htm
... ...
}.
```

In block S209, it is judged whether coverage rate of webpages in each group and the identification accuracy of webpage types meet a requirement, the procedure in block S210 is performed in response to a determination that the coverage rate and the identification accuracy meet the requirement, or the procedure in block S205 is perform in response to a determination that the coverage rate and the identification accuracy do not meet the requirement.

In an embodiment, whether the coverage rate of the webpages in the group meets the requirement may be determine by judging whether the number of webpages in each group is smaller than a threshold N, and whether the identification accuracy of webpage types meets the requirements by judging whether an entropy E of each group is smaller than a threshold T. It may be determined that the coverage rate of webpages in a group and identification accuracy of webpage types of the group meet the requirement in response to a determination that the number of webpages in the group is smaller than the threshold N and the entropy E of the group is smaller than the threshold T. On the contrary, it may be determined that the coverage rate of webpages in a group and identification accuracy of webpage types of the group do not meet the requirement in response to a determination that the number of webpages in the group is larger than the threshold N and the entropy E of the group is not smaller than the threshold T. The entropy E=sum (pi*log(pi)), i=1, 2 . . . , n, wherein n is the number of webpages in the group, pi is the probability of webpages of the same type occurring in the group. Supposing a group includes 9 webpages of the type of news, 1 webpage of the type of blog, the entropy of the group is E=0.9*log 0.9+ 0.1*log 0.1. When the entropy E meets the requirement, it means the accuracy of converging webpages of the type is high.

In block S210, the convergence is terminated, and webpage classification rules are generated and stored into a webpage classification rule base.

In this procedure, a webpage classification rule is a mode which includes a group of web addresses and information of a type of webpages in the group, e.g., the type of news.

In an embodiment, common characteristics of webpage samples of the same webpage type are extracted, and a relation may be generated to associate the common characteristics with the webpage type.

In an embodiment, when a classifier has been generated, and the pre-classified webpage samples are not accessible, the groups of webpage samples may be obtained by using the classifier to classify a number of un-classified webpages. The rules can be obtained by using the method of analyzing the components as described in S205, and the converging process can be omitted since the webpages have been classified by the classifier.

In block S211, a web address (e.g., a Uniform/Universal Resource Locator (URL)) of a webpage which is to be classified is received and analyzed to obtain components of the web address.

In this procedure, the web address to be classified may be in the form of http://domain name X/directory name A/directory name B/.../abc.html, and the components obtained may include the protocol type "http", the domain name "X", directory names "A" and "B", and a parameter "abc.html". In an embodiment, at least one of the components of the web address may be parsed into a character string, e.g., the directory names A and B may be parsed into 20110202, and the like.

In block S213, it is judged whether at least one of the components of the web address to be classified matches with a webpage classification rule, and the procedure in block S215 may be performed in response to a determination that the at least one component matches with the webpage classification rule, or the procedure in block S212 may be performed in response to a determination that the at least one component does not match with any webpage classification rule.

The webpage classification rule may be a multi-pattern string including a relation which associates a group of web addresses with a webpage type. Suppose in a webpage classification rule, a character string obtained by parsing a directory name in web addresses in a group is 2010* (* represents any information, e.g., characters, digits, and the like), and the type of the group is "news". When a web address to be classified has a directory name which is parsed to be 20100202, it is determined that the web address matches with the webpage classification rule. When a web address to be classified has a directory name which is parsed to be 20120202, it is determined that the web address does not match with the webpage classification rule.

In an embodiment, it is judged whether the web address matches with each of multiple webpage classification rules, and the matching process may be terminated when a matched rule is found. In another embodiment, the matching process may be performed for each rule, and a webpage may be classified into more than one types.

In block S212, the web address to be classified is sent to a webpage classifier to obtain the type of the webpage.

In an embodiment, the web address of the webpage to be classified is sent to a webpage classifier for classification to obtain the type of the webpage. The webpage classifier judges whether the webpage matches with a web address in the webpage classifier, and determines the type of the webpage is the type of the web address in the webpage classifier in response to a determination that the webpage matches with a web address in the webpage classifier, or terminates the process in response to a determination that the webpage does not match with any web address in the webpage classifier.

In an embodiment, the classifier may adopt conventional classifier techniques, such as classifier based on Simple Bias, classifier based on Support Vector Machine (SVM) and so on. The training process and the classifying process of the classifier are similar to those of conventional classifiers.

For training a classifier, a number of webpage samples are collected and classified in advance, e.g., "news.qq.com/a/123.html" classified as news, "bbs.hupu.com/a/123.html" classified as forum, and so on. The types of webpage samples decide the types of webpages that can be identified by the classifier obtained.

Then, characteristics of the webpage samples are extracted, e.g., the characteristics may include characteristics of the web addresses of the webpage samples, and/or characteristics of titles of the webpage samples, and/or characteristics of content of the webpage samples. The characteristics of the web addresses may be characters (including characters, words, digits, symbols and the like) included in the web addresses, e.g., news, bbs, blog, music, entertainment and so on, or a multi-pattern string in a string obtained by parsing components of the web addresses using a parsing method, e.g., 2010, and so on. The characteristics of titles may be words included in the titles of the webpages, e.g., words such as post, Infor, blog, and the like. The characteristics of content may be words or phrases in text of the webpages, e.g., words such as Routers reported, Re, and so on.

After that, a probability of each characteristic belonging to a type is calculated based on a mathematics model, e.g., a Simple Bias model and the like, by using the pre-classified webpage samples. A classifier is then obtained which is able to classify a webpage by using the probability of the characteristics with respect to each of the types.

For classifying a webpage, after a webpage to be classified is received, characteristics of the webpage are extracted. The classifier may calculate a probability of the webpage belonging to each of the types, and output a type that has the highest probability as an estimation result, i.e., the estimated type of the webpage.

The classification may be performed only based on the web address of the webpage or the content of the webpage, or based on both the web address and the content of the webpage, and this can be implemented by training the classifier using characteristics obtained from the web addresses and/or the content of the webpages in the webpage samples.

In block S115, the type of the webpage to be classified is obtained by using the webpage classification rule.

In an embodiment, when at least one component of the web address matches with the webpage classification rule, the webpage is classified by using the webpage classification rule to obtain the type of the webpage, i.e., the webpage type corresponding to the webpage classification rule is determined to be the type of the webpage. Taking a webpage classification rule as an example, according to the rule, a character string obtained by parsing a directory name in web addresses in a group is 2010* (* represents any data, e.g., characters, digits, and the like), and the type of the group is news. If a web address of a webpage to be classified has at least one directory name which is parsed to be 20100303, it is determined the type of the webpage to be classified is the type of "news".

Block S215 may also include: storing the web address and the type of the webpage.

In an embodiment, webpage classification rules are generated by analyzing and converging results outputted by the webpage classifier, and the type of the webpage is obtained by judging whether at least one component of the web address matches with a webpage classification rule and classifying the webpage by using the webpage classification rule when the at least one component of the web address matches with the webpage classification rule or classifying the webpage by inputting the web address into a webpage classifier. Therefore, the type of the webpage can be determined by using only the web address, the process is fast in speed, highly efficient, good coverage of various knowledge fields, and is applicable to online real-time webpage type estimation.

Figure 3:
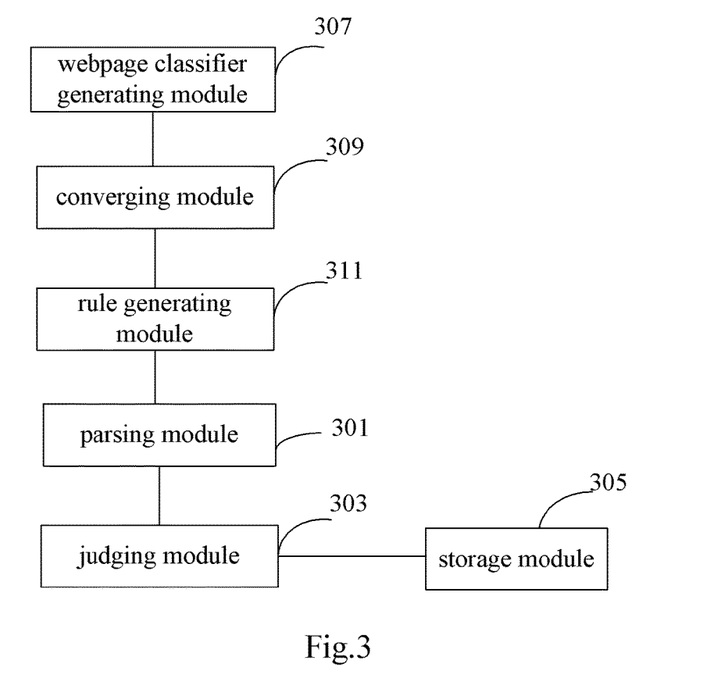
FIG. 3 is a schematic diagram illustrating a structure of an apparatus for identifying webpage type according to an embodiment of the present disclosure.

FIG. 3 is a schematic diagram illustrating a structure of an apparatus for identifying webpage type according to an embodiment of the present disclosure. As shown in FIG. 1, FIG. 2 and FIG. 3, the apparatus for identifying webpage type may include: a parsing module 301 and a judging module 303.

The parsing module 301 receives a web address of a webpage to be classified, obtains components of the web address by parsing the web address.

The judging module 303 judges whether at least one of the components of the web address matches with a webpage classification rule, classifies the webpage by using the webpage classification rule in response to a determination that at least one of the components of the web address matches with a webpage classification rule, or classifies the webpage by sending the web address into a webpage classifier to obtain the type of the webpage in response to a determination that the at least one of the components of the web address does not match with any webpage classification rule.

The apparatus may also include: a storage module 305, a webpage classifier generating module 307, a converging module 309 and a rule generating module 311.

The webpage classifier generating module 307 performs training using webpage samples to generate a relation which associates web addresses with a webpage type, and stores the relation in a webpage classifier.

The converging module 309 obtains pre-stored all of web addresses and webpage types, parses all of the web addresses to obtain a collection of components of the web addresses, converges web addresses that have at least one identical component into a group according to a pre-defined converging method to generate multiple groups.

The rule generating module 311 judges whether a coverage rate of webpages in each group and an identification accuracy of webpage type of the group meet a requirement, stops converging to generate webpage classification rules and stores the webpage classification rules into a webpage classification rule base in response to a determination that the coverage rate and the identification accuracy meet the requirement. The rule generating module 311 may continue the converging in response to a determination that the coverage rate and the identification accuracy do not meet the requirement.

It may be determined that the coverage rate of webpages in a group and the identification accuracy of webpage types of the group meet the requirement in response to a determination that the number of webpages in the group is smaller than the threshold N and the entropy E of the group is smaller than the threshold T. On the contrary, it may be determined that the coverage rate of webpages in a group and identification accuracy of webpage types of the group do not meet the requirement in response to a determination that the number of webpages in the group is larger than the threshold N and the entropy E of the group is not smaller than the threshold T. The entropy E=sum(pi*log(pi)), i=1, 2 . . . , n, wherein n is the number of webpages in the group, pi is the probability of webpages of the same type occurring in the group.

The storage module 305 stores web addresses and the type of the webpage corresponding to the web address.

In an embodiment, webpage classification rules are generated by analyzing and converging the results outputted by the webpage classifier, and the type of the webpage is obtained by judging whether at least one component of the web address matches with a webpage classification rule and classifying the webpage by using the webpage classification rule when the at least one component of the web address matches with the webpage classification rule or classifying the webpage by inputting the web address into a webpage classifier. Therefore, the type of the webpage can be determined by using only the web address, the process is fast in speed, highly efficient, good coverage of various knowledge fields, and is applicable to online real-time webpage type estimation.

Figure 4:
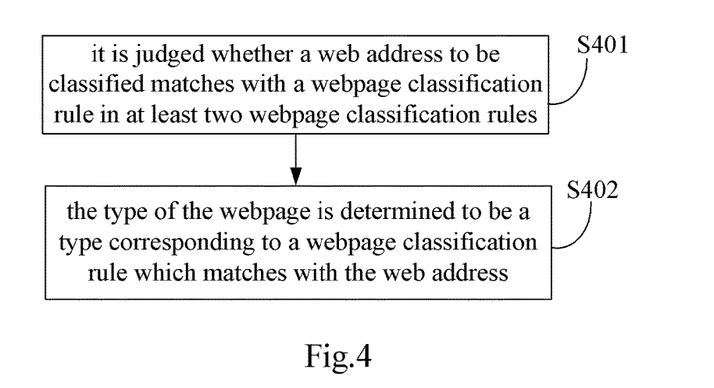
FIG. 4 is a flowchart illustrating a method for identifying webpage type according to an embodiment of the present disclosure.

FIG. 4 is a flowchart illustrating a method for identifying webpage type according to an embodiment of the present disclosure. The method may include the following procedures.

In block S401, it is judged whether a web address to be classified matches with a webpage classification rule in at least two webpage classification rules.

A webpage classification rule may associate a type with characteristics of a web address or with characteristics of at least one component of a web address, e.g., a domain name and/or at least one directory name of a web address and the like.

In an example, components of a web address of a webpage to be classified may be obtained before the judging process. Then it is judging whether at least one of the components of the web address matches with a webpage classification rule in at least two webpage classification rules.

In block S402, the type of the webpage is determined to be a type corresponding to a webpage classification rule which matches with the web address.

In this way, the type of a webpage can be determined by using only the web address of the webpage.

The method of generating the webpage classification rules is similar to that described above.

The method of identifying the type of a webpage may be applied to various application scenarios for different purposes, e.g., for presenting the webpage in a different format, for collecting statistics of browsing habits of users for targeted advertising, and so on. The following takes presenting the webpage in a format different with an original format of the webpage as an example.

Figure 5:
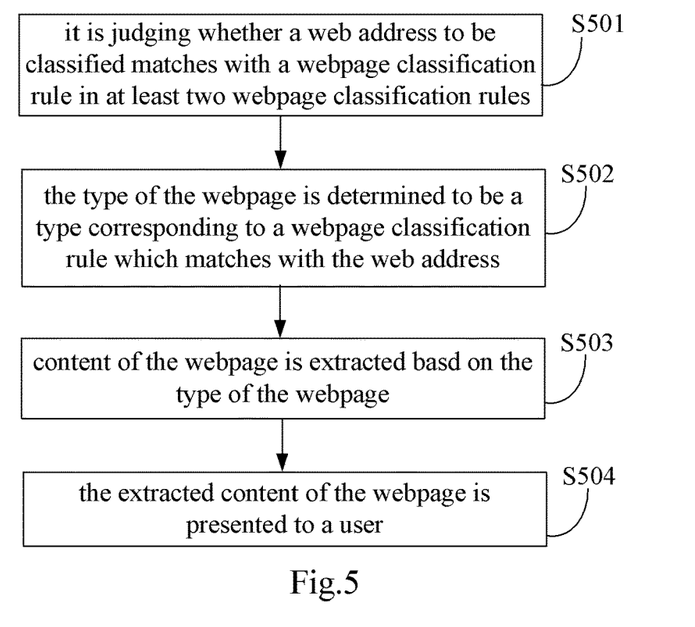
FIG. 5 is a flowchart illustrating a method for presenting a webpage according to an embodiment of the present disclosure.

FIG. 5 is a flowchart illustrating a method for presenting a webpage according to an embodiment of the present disclosure.

In block S501, it is judging whether a web address to be classified matches with a webpage classification rule in at least two webpage classification rules.

In block S502, the type of the webpage is determined to be a type corresponding to a webpage classification rule which matches with the web address.

In block S503, content of the webpage is extracted based on the type of the webpage.

In an example, the content may be text when the type of the webpage is news; the content may be a URL of a music file when the type of the webpage is music, the content may include a poster of a post, content of the post, time of the post etc. when the type of the webpage is forum, the content may include a title of an article, content of the article, etc. when the type of the webpage is blog, and so on. Other contents of the webpage may be extracted according to the purpose of the extraction.

In block S504, the extracted content of the webpage is presented to a user in a pre-defined manner. The pre-defined manner may be different from the manner in which the webpage was originally supposed to be presented.

In this way, content of a webpage can be presented to a user according to the type of the webpage. This method may be applied to presenting webpages on a handset with a smaller screen than that of a PC display, where core content of a webpage may be extracted according to the type of the webpage and presented to a user in a format suitable for being displayed on a handset screen while unnecessary information, such as advertisements, accessories and the like, will not be presented on the handset screen. Thus, this method may provide better viewing effects of the webpage on the handset screen and reduce the amount of data downloaded by the handset for a webpage, thus reduce power consumption of the handset for Internet browsing.

In other examples, the method for identifying webpage type may also be applied to other scenarios, such as targeted advertising. By identifying the type of webpages browsed by a user, statistics of the browsing habit of the user can be obtained based on the type. The statistics may be used in various technical schemes, e.g., a website server may provide targeted advertisements for a user according to the statistics which shows browsing habits of a user or the field in which the user is interested.

Figure 6:
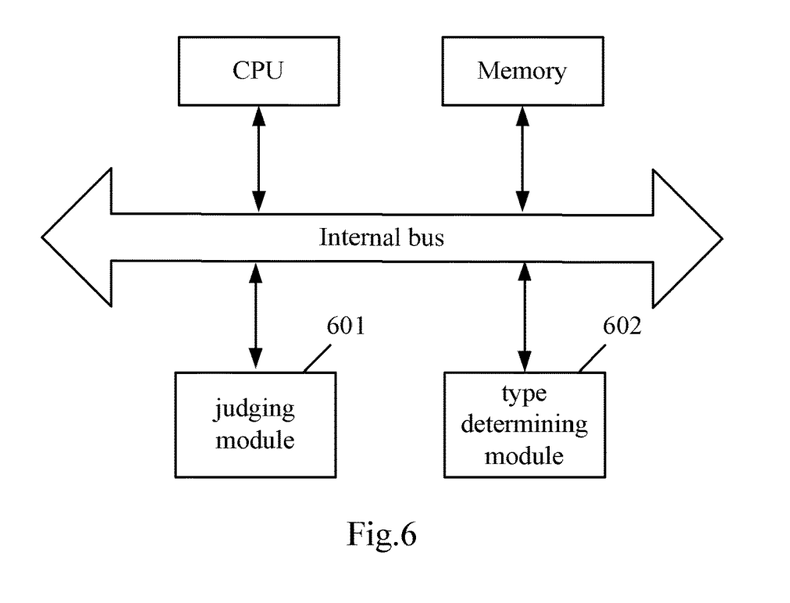
FIG. 6 is a flowchart illustrating an apparatus for identifying webpage type according to an embodiment of the present disclosure.

FIG. 6 is a flowchart illustrating an apparatus for identifying webpage type according to an embodiment of the present disclosure. As shown in FIG. 6, the apparatus for identifying webpage type may include: a judging module 601, a type determining module 602, a CPU, a memory and an internal bus.

The judging module 601 judges whether a web address to be classified matches with a webpage classification rule in at least two webpage classification rules.

The type determining module 602 determines the type of the webpage to be a type corresponding to a webpage classification rule which matches with the web address found by the judging module 601.

The CPU performs calculations.

The memory stores various data, such as the webpage classifying rules, the webpage, and intermediate data generated during the processing.

The internal bus implements communications between the modules, may be a bus connected with each of the modules or a collection of wired or wireless links between the modules.

Functions of the judging module 601 and the type determining module 602 are implements with assistance of the CPU, the memory and the internal bus. For purposes of simplicity and clarity, the functions are described as implemented by the judging module 601 and the type determining module 602 in the above.

Figure 7:
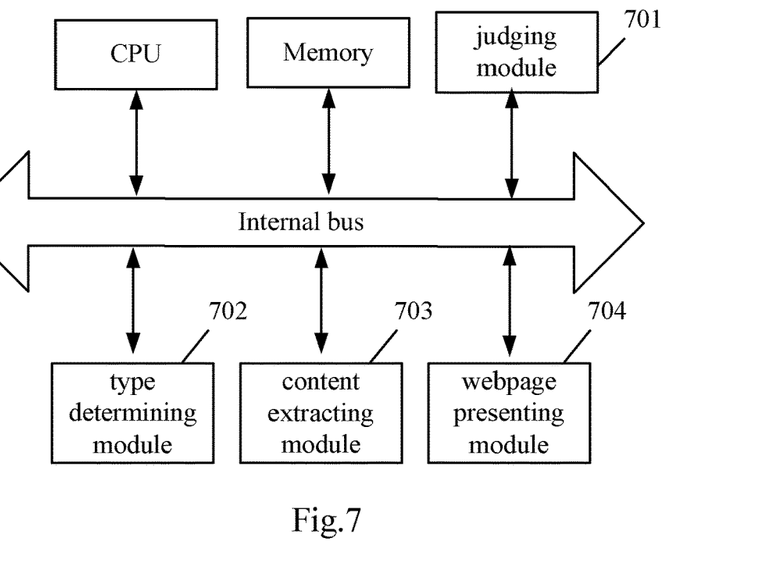
FIG. 7 is a schematic diagram illustrating a structure of an apparatus for presenting a webpage according to an embodiment of the present disclosure.

FIG. 7 is a schematic diagram illustrating a structure of an apparatus for presenting a webpage according to an embodiment of the present disclosure. As shown in FIG. 7, the apparatus may include the following components.

A judging module 701 judges whether a web address to be classified matches with a webpage classification rule in at least two webpage classification rules.

A type determining module 702 determines the type of the webpage is determined to be a type corresponding to a webpage classification rule which matches with the web address found by the judging module 701.

A content extracting module 703 extracts content of the webpage based on the type of the webpage determined by the type determining module 702.

A webpage presenting module 704 presents the content of the webpage extracted by the content extracting module 703 to a user in a pre-defined manner.

A CPU performs calculations.

A memory stores various data, such as the webpage classifying rules, the webpage, and intermediate data generated during the processing.

An internal bus implements communications between the modules, may be a bus connected with each of the modules or a collection of wired or wireless links between the modules.

Functions of the judging module 701 and the type determining module 702, the content extracting module 703 and the webpage presenting module 704 are implements with assistance of the CPU, the memory and the internal bus. For purposes of simplicity and clarity, the functions are described as implemented by the above modules in the above description.

It should be understood that in the above processes and structures, not all of the procedures and modules are necessary. Certain procedures or modules may be omitted according to the needs. The order of the procedures is not fixed, and can be adjusted according to the needs. Those skilled in the art can understand the modules in the apparatus of embodiments of the present invention may be located in the apparatus as described in the embodiments, or may be located in one or more apparatuses of the embodiments of the present invention when modified accordingly. The modules in embodiments of the present invention may be combined into one module, or may be further divided into multiple sub modules.

All or part of the above procedures may be implemented by hardware under control of a computer program. The computer program may be stored in a computer readable non-transitory storage medium. When being executed, the program causes the hardware to implement the procedures in the above methods. The storage medium may be a magnetic disk, an optical disk, a Read-Only Memory (ROM) or a Random Access Memory (RAM) and so on.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The scope of the claims should not be limited by the embodiments set forth in the examples, but should be given the broadest interpretation consistent with the description as a whole.

The invention claimed is:

1. A method for identifying webpage type, comprising:
at a device having a processor and a screen,
reading pre-stored web addresses of a webpage type, obtaining a collection of string components of the web addresses by parsing the web addresses;
converging web addresses having at least one identical string component into one group according to a pre-defined converging method to generate multiple groups;
determining that a coverage rate of a group meets a requirement in response to a determination that a total number of webpages in the group is smaller than or equal to a first threshold and determining that an identification accuracy of the group meets the requirement in response to a determination that an entropy is smaller than a second threshold;
determining the coverage rate and the identification accuracy of the group do not meet the requirement in response to a determination that the total number of webpages in the group is larger than the first threshold or the entropy is larger than or equal to a second threshold; wherein the entropy satisfies E=sum(pi*log (pi)), i=1, 2 . . . , n, wherein n is the total number of webpages in the group, pi is a probability of webpages of a same type occurring in the group;
terminating converging in response to the determination that the coverage rate and the identification accuracy meet the requirement;
generating a webpage classification rule using the multiple groups and the webpage type, and storing the webpage classification rule into a webpage classification rule base;
judging whether a web address of a webpage to be classified matches a webpage classification rule;
determining a type of the webpage to be a type corresponding to a webpage classification rule which matches the web address;
in response to a judgment that the web address of the webpage to be classified does not match the webpage classification rule, using a classifier trained using a machine learning algorithm based on web addresses to determine the webpage type of the webpage to be classified;
extracting a content of the webpage selectively according to the webpage type; and
displaying, on the screen, the content to a user in a pre-defined manner corresponding to the webpage type.

2. The method of claim 1, wherein the webpage classification rule comprises a string expression associated with a webpage type, the string expression is extracted from a plurality of first web addresses pre-classified into the webpage type, the string expression describes characteristics shared by the plurality of first web addresses and comprises a first description string component describing a domain name and at least a second description string component describing at least one web address string component sequentially following the domain name in the plurality of first web addresses.

3. The method of claim 2, wherein judging whether the web address of the webpage to be classified matches the webpage classification rule in at least two webpage classification rule components comprises:
   extracting domain name and another string component from the web address of the webpage to be classified; and
   judging whether the extracted domain name and string components matches string expression corresponding to the webpage classification rule.

4. The method of claim 3, wherein judging whether the extracted domain name and string components matches string expression corresponding to the webpage classification rule comprises:
   determining whether the domain name matches the first description string component of the webpage classification rule; and
   determining whether the another string component matches the second description string component of the webpage classification rule.

5. The method of claim 3, further comprising:
   storing the web address and the webpage type of the web page to be classified in response to a determination that the domain name and the another string component of the web address of the webpage to be classified match the string expression of the webpage classification rule.

6. The method of claim 2, wherein extracting the string expression comprises:
   extracting a description of shared characteristics of web address string components in each of at least one tier of the plurality of first web addresses sequentially starting from a tier for domain names of the plurality of first web addresses to obtain at least one description corresponding to the at least one tier;
   sequentially arranging the at least one description corresponding to the at least one tier according to an order of the at least one tier arranged in the plurality of first web addresses to obtain the string expression.

7. The method of claim 6, wherein extracting the description of shared characteristics of the web address string components in each of at least one tier of the plurality of first web addresses comprises:
   arranging the plurality of first web addresses into a tree where a node for a web address string component of a first tier which follows a second tier in web addresses serves as a child node of a node for a web address string component of the second tier; and
   converging a plurality of nodes at a same tier having a same parent node into one node whose value is a description of shared characteristics of the plurality of nodes;
   wherein the string expression comprises a value of each node which is an only child node of a parent node, the parent node is a node for domain name or a descendant node of the node for domain name.

8. The method of claim 6, wherein extracting the description of shared characteristics of web address string components comprises:
   converting each of the web address string components into a string according to a pre-determined converting method; and
   in response to a determination that the web address string components are converted into a same string, determining the string to be the description of shared characteristics of the web address string components.

9. An apparatus for identifying webpage type, comprising:
   at least one processor;
   a display screen; and
   memory for storing computer-readable instructions,
   wherein the at least one processor, when executing the computer-readable instructions, is configured to:
      read pre-stored web addresses of a webpage type, obtaining a collection of string components of the web addresses by parsing the web addresses;
      converge web addresses having at least one identical string component into one group according to a pre-defined converging method to generate multiple groups;
      determine that a coverage rate of a group meets a requirement in response to a determination that a total number of webpages in the group is smaller than or equal to a first threshold and determining that an identification accuracy of the group meets the requirement in response to a determination that an entropy is smaller than a second threshold;
      determine the coverage rate and the identification accuracy of the group do not meet the requirement in response to a determination that the total number of webpages in the group is larger than the first threshold or the entropy is larger than or equal to a second threshold; wherein the entropy satisfies E=sum (pi*log(pi)), i=1, 2 . . . , n, wherein n is the total number of webpages in the group, pi is a probability of webpages of a same type occurring in the group;
      terminate converging in response to the determination that the coverage rate and the identification accuracy meet the requirement;
      generate a webpage classification rule using the multiple groups and the webpage type, and storing the webpage classification rule into a webpage classification rule base;
      judge whether a web address of a webpage to be classified matches a webpage classification rule;
      determine a type of the webpage to be a type corresponding to a webpage classification rule which matches the web address;
      in response to a judgment that the web address of the webpage to be classified does not matches the webpage classification rule, use a classifier trained using a machine learning algorithm based on web addresses to determine the webpage type of the webpage to be classified;
      extract a content of the webpage selectively according to the webpage type; and
      display, on the display screen, the content to a user in a pre-defined manner corresponding to the webpage type.

10. The apparatus of claim 9, wherein the webpage classification rule comprises a string expression associated with a webpage type, the string expression is extracted from a plurality of first web addresses pre-classified into the webpage type, the string expression describes characteristics shared by the plurality of first web addresses and comprises a first description string component describing a domain name and at least a second description string component describing at least one web address string component sequentially following the domain name in the plurality of first web addresses.

11. The apparatus of claim 10, wherein the at least one processor, when executing the computer-readable instructions to judge whether the web address of the webpage to be classified matches the webpage classification rule in at least two webpage classification rule components, is configured to:
- extract domain name and another string component from the web address of the webpage to be classified; and
- judge whether the extracted domain name and string components matches string expression corresponding to the webpage classification rule.

12. The apparatus of claim 11, wherein the at least one processor, when executing the computer-readable instructions to judge whether the extracted domain name and string components matches string expression corresponding to the webpage classification rule, is configured to:
- determine whether the domain name matches the first description string component of the webpage classification rule; and
- determine whether the another string component matches the second description string component of the webpage classification rule.

13. The apparatus of claim 11, the at least one processor, when executing the computer-readable instructions, is further configured to:
- store the web address and the webpage type of the web page to be classified in response to a determination that the domain name and the another string component of the web address of the webpage to be classified match the string expression of the webpage classification rule.

14. The apparatus of claim 10, wherein the at least one processor, when executing the computer-readable instructions to extract the string expression, is configured to:
- extract a description of shared characteristics of web address string components in each of at least one tier of the plurality of first web addresses sequentially starting from a tier for domain names of the plurality of first web addresses to obtain at least one description corresponding to the at least one tier;
- sequentially arrange the at least one description corresponding to the at least one tier according to an order of the at least one tier arranged in the plurality of first web addresses to obtain the string expression.

15. The apparatus of claim 14, wherein the at least one processor, when executing the computer-readable instructions to extract the description of shared characteristics of the web address string components in each of at least one tier of the plurality of first web addresses, is configured to:
- arrange the plurality of first web addresses into a tree where a node for a web address string component of a first tier which follows a second tier in web addresses serves as a child node of a node for a web address string component of the second tier; and
- converge a plurality of nodes at a same tier having a same parent node into one node whose value is a description of shared characteristics of the plurality of nodes;
- wherein the string expression comprises a value of each node which is an only child node of a parent node, the parent node is a node for domain name or a descendant node of the node for domain name.

16. The apparatus of claim 14, wherein the at least one processor, when executing the computer-readable instructions to extract the description of shared characteristics of web address string components, is configured to:
- convert each of the web address string components into a string according to a pre-determined converting method; and
- in response to a determination that the web address string components are converted into a same string, determine the string to be the description of shared characteristics of the web address string components.

* * * * *